(12) United States Patent
Matheson

(10) Patent No.: US 6,718,218 B1
(45) Date of Patent: Apr. 6, 2004

(54) CAD DATA MODEL WITH DESIGN NOTES

(75) Inventor: Dan Matheson, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 303 days.

(21) Appl. No.: 09/680,749

(22) Filed: Oct. 6, 2000

(51) Int. Cl.$^7$ ............................................. G06F 19/00
(52) U.S. Cl. .................. 700/95; 700/182; 700/118; 345/964
(58) Field of Search ............... 700/95, 98, 118, 700/182; 345/964; 707/100, 101, 103 R (56) References Cited

U.S. PATENT DOCUMENTS

| | | | |
|---|---|---|---|
| 5,542,078 A | * | 7/1996 | Martel et al. ............... 707/101 |
| 5,646,862 A | * | 7/1997 | Jolliffe et al. ............... 703/1 |
| 5,856,925 A | * | 1/1999 | Maeda et al. ............... 716/5 |
| 5,910,804 A | * | 6/1999 | Fortenbery et al. ......... 345/419 |
| 6,169,993 B1 | * | 1/2001 | Shutt et al. ............... 707/103 R |
| 6,289,254 B1 | * | 9/2001 | Shimizu et al. ............... 700/96 |
| 6,295,513 B1 | * | 9/2001 | Thackston ............... 703/1 |
| 6,445,974 B1 | * | 9/2002 | Malaugh et al. ............ 700/182 |
| 2002/0012007 A1 | * | 1/2002 | Twigg ............... 345/677 |

FOREIGN PATENT DOCUMENTS

EP 0 558 006 A2 2/1993

OTHER PUBLICATIONS

P.C. Lockemann: Das Ei des Kolumbus ist noch nicht gefunden; TR 17/90, 1990, pp. 102–110.
W. Ahrens: Produktdatentechnologie: STEP für die Produktsleittechnik?! (part 2); atp 39 (1997), 7, 1997, pp. 40–48.

* cited by examiner

*Primary Examiner*—Leo Picard
*Assistant Examiner*—Zoila Cabrera (57) ABSTRACT

A CAD data object model and interface which captures and stores information relating to CAD data, including geometry, topology, design notes, and non-geometry drawing information, along with their associated relationships, is presented. The information and relationships are separately captured and accessible via a publicly defined interface. In one embodiment, the captured CAD data objects saved in separate relational database files, separated according to type. Because the CAD model objects are stored in a tool neutral persistent form, any application can access the information contained in those objects.

15 Claims, 6 Drawing Sheets

| CAD PART ID | DESCRIPTION | COMMON NAME | OWNER | CREATOR | LAST UPDATE DATE | LAST UPDATED BY | STATUS | PROPERTIES | COORDINATE SYSTEM |
|---|---|---|---|---|---|---|---|---|---|
| 501 | 502 | 503 | 504 | 505 | 506 | 507 | 508 | 509 | 510 |

FIG. 6

| CAD PART ID | NOTE ID | DESCRIPTION | NAME | REFERENCE |
|---|---|---|---|---|
| | | | | |
| | | | | |
| | | | | |
| | | | | |
| | | | | |

| NOTE ID | TRANSFORMATION |
|---|---|
| | |
| | |
| | |
| | |
| | |

NOTE ☒

TYPE: [General ▼]  821
- Action Item
- Decision
- Issue

Creation Time: [          ] 823
Author: [          ] 822

CONTENTS 824
[                              ]

[ OK ]   [ Cancel ]

CAD DATA MODEL WITH DESIGN NOTES

FIELD OF THE INVENTION

The present invention pertains generally to information management, and more particularly to a system and method for storing and accessing a Computer Aided Design (CAD) object model in a tool neutral persistent form.

BACKGROUND OF THE INVENTION

Computer Aided Design (CAD) tools assist in the design of mechanical parts and assemblies by allowing a designer to produce 2- and 3-dimensional (2D/3D) virtual models of the parts/assemblies. Often during the design process, a designer will want to associate a design note that describes information such as the reasoning behind a particular design choice, a reminder to add or modify an aspect of the model, or a note to another designer who will be viewing the note. Also during the design process, it may be desirable to save certain views of the model (and associate design notes to those views) and/or alternative design models for a particular part/assembly for later retrieval. Such CAD tools may be integrated with or accessed by a collaboration tool which allows multiple networked users (who may be remotely located from one another) to simultaneously view and modify parts/assemblies that are loaded into the collaboration session.

In the current state of the art, all information associated with a particular CAD model of a part/assembly is entered, stored, owned, and retrieved only via the particular CAD tool used to create the model. However, there are many reasons why it would be advantageous to have the ability to access the CAD model data without using the CAD tool. One example is that some of the information stored in the CAD model data may be useful to other non-design engineers. For example, managers, customers, or other engineers not involved in the design of a particular product may be interested in accessing the design notes associated with a particular product design in order to understand the reasons for certain design choices. For these parties (who would otherwise have no reason to use the CAD tool), it would be desirable, due to expensive CAD system licensing considerations, to have the ability to retrieve the contents of these design notes without having to enter the CAD tool environment.

Another example of a reason for accessing CAD model data without entering the CAD tool environment might be to prepare a bill of materials for a completed product design. The CAD model data of a completed design might already include manufacturer's part numbers, which could be accessed and quantified to generate a bill of materials to produce the product. Those skilled in the art will appreciate that numerous other examples of reasons for desiring access to articles of information stored in a CAD Model database from outside the CAD tool exist.

Accordingly, a need exists for a way to capture, store, and retrieve CAD model data in a tool neutral form that allows any tool to access (and modify where appropriate) the CAD Model data created from within the CAD tool. It would be desirable if changes were made to the CAD Model data for the CAD tool to also be able to recognize the changes.

Another problem with current CAD data modeling is the inability of current CAD tools (or any other type of tool) to cumulatively capture the incremental build-up of information over time that is associated with a project, including the design choices and reasoning behind those choices, problems encountered during the design and the resulting solutions to those problems, and the design alternatives explored and the reasoning behind the choice of designs. In other words, what is needed is a way to capture and track the functional "as-designed" aspects of a product rather than the "as-built" configurations of the end product that the prior art CAD tools capture.

SUMMARY OF THE INVENTION

The present invention is a system and method for capturing, storing, and accessing CAD model data in a tool neutral persistent form, thereby allowing access to the data by any tool via a publicly defined interface and allowing the clear incremental build-up of information across the entire process using various computer-based applications. Information is represented in a form that may be presented in different ways.

The present invention preferably includes a CAD Model object model which captures and stores various object models containing articles of information and their associated relationships in an object model database. Each object model includes information and relationships that are accessible via a publicly defined interface. In one embodiment, when an object model is saved to the object model database, various types of articles of information contained in the object model, along with their relationships to other articles of information, are saved in separate relational database files associated with the articles of information. Applications accessing the object model database merely use the defined object model interface, which results in the automatic separation and storage of data type objects in a tool neutral persistent form.

The invention facilitates access to information by any application via the defined object model interfaces, without regard to which application created the objects. Thus, there is no "ownership" of the data by any application, including the tool that created the data.

The invention also facilitates sophisticated queries on the object models to extract interesting information from the totality of stored information. The invention is advantageous for many reasons, including the ability for multiple people with different roles to access and extract the information in ways that are meaningful to their role. In addition, because the object models are stored in a tool neutral form, information can be obtained from the object model database without requiring the user to use a specific application tool and incurring expensive licensing costs associated with that tool.

BRIEF DESCRIPTION OF THE DRAWINGS

The invention will be better understood from a reading of the following detailed description taken in conjunction with the drawing in which like reference designators are used to designate like elements, and in which.

DETAILED DESCRIPTION

Figure 1:
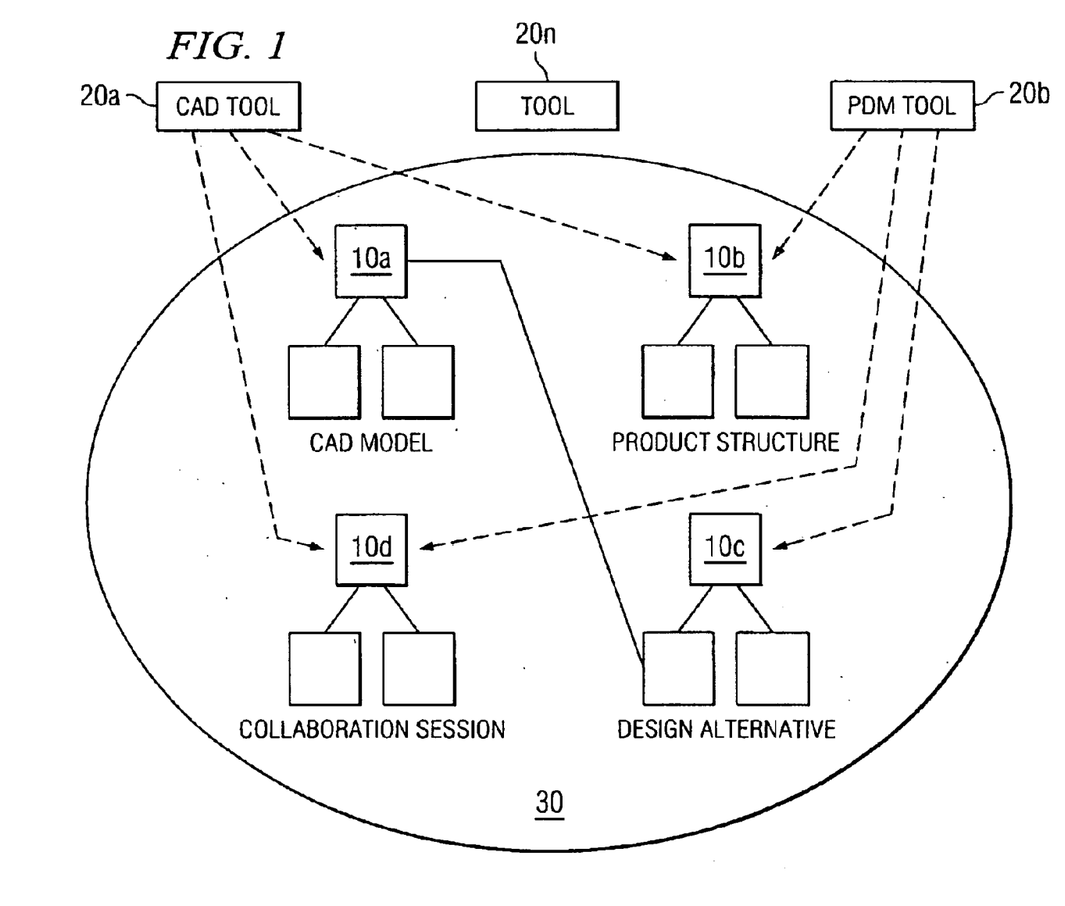
FIG. 1 is a conceptual block diagram illustrating the separation of articles of information and their associated relationships to other articles of information.

FIG. 1 is a conceptual block diagram illustrating the separation of articles of information and their associated relationships to other articles of information, illustrating the accessibility of the information by various tools. In particular, a collection of object models 10a, 10b, 10c, 10d describing information and object relationships created by a variety of different tools 20a, 20b, . . . , 20n during the development of a product are stored in a tool neutral form in persistent storage 30. Importantly, the object models 10a, 10b, 10c, 10d are not owned by any tool, including the tools 20a, 20b, . . . , 20n that created them. Each object model 10a, 10b, 10c, 10d contains objects that have highly dependent object relationships. Model relationships may also be defined for navigational use, as described hereinafter.

The object models 10a, 10b, 10c, 10d each have a defined public interface that allows any tool 20a, 20b, . . . , 20n that understands the interface definition to read and write legal data to the corresponding set of objects. Although it may be that only one application tool completely understands a single attribute (i.e., a CAD tool that understands a 3D geometry and topology), the public interface definition allows virtually any tool to access parts of the object that is does understand, including its relationships with other objects. For example, the CAD tool 20a (e.g., SolidDesigner) creates data that is stored partly in the CAD Model object model 10a and partly in the Product Structure object model 10a. It is important to note that the CAD tool 20a is not required to change its internal data structure or user interface; rather the CAD tool 20a need only have capability to understand only those objects and structure that it reads and writes (which may be accomplished using an extension that allows import/export capability, techniques of which are well-known in the art). In this example, a Product Data Management (PDM) tool 20b (e.g., CoCreate Software, Inc.'s WorkManager) accesses the Product Structure model 10b and Design Alternative model 10c. Accordingly, the PDM tool 20b must have capability for handling changes made to the Product Structure model 10b made by the CAD tool 20a, and likewise, the CAD tool 20a must have the capability of handling changes made to the Product Structure model 10b by the PDM tool 20a. The common object model (i.e., Product Structure model 10b ) that they understand thereby enhances the collaboration between the CAD tool 20a and PDM tool 20b.

It is also important to note that other tools (e.g., 20n ) can also access the object models 10a, 10b, 10c, 10d at any time, and the collection of object models 10a, 10b, 10c, 10d, can be expanded at any time. Accordingly, the collection of information and relationships with other objects expands and evolves over the course of the product cycle, capturing the "as-designed" aspects of the product. In addition, the tool neutral persistent form of the object models allow both synchronous and asynchronous collaboration of the product development by allowing many different people (e.g., engineers, management, administrative personnel, and even customers) with appropriate permissions to access the data contained in the object models, which represents current state of the product.

Figure 2:
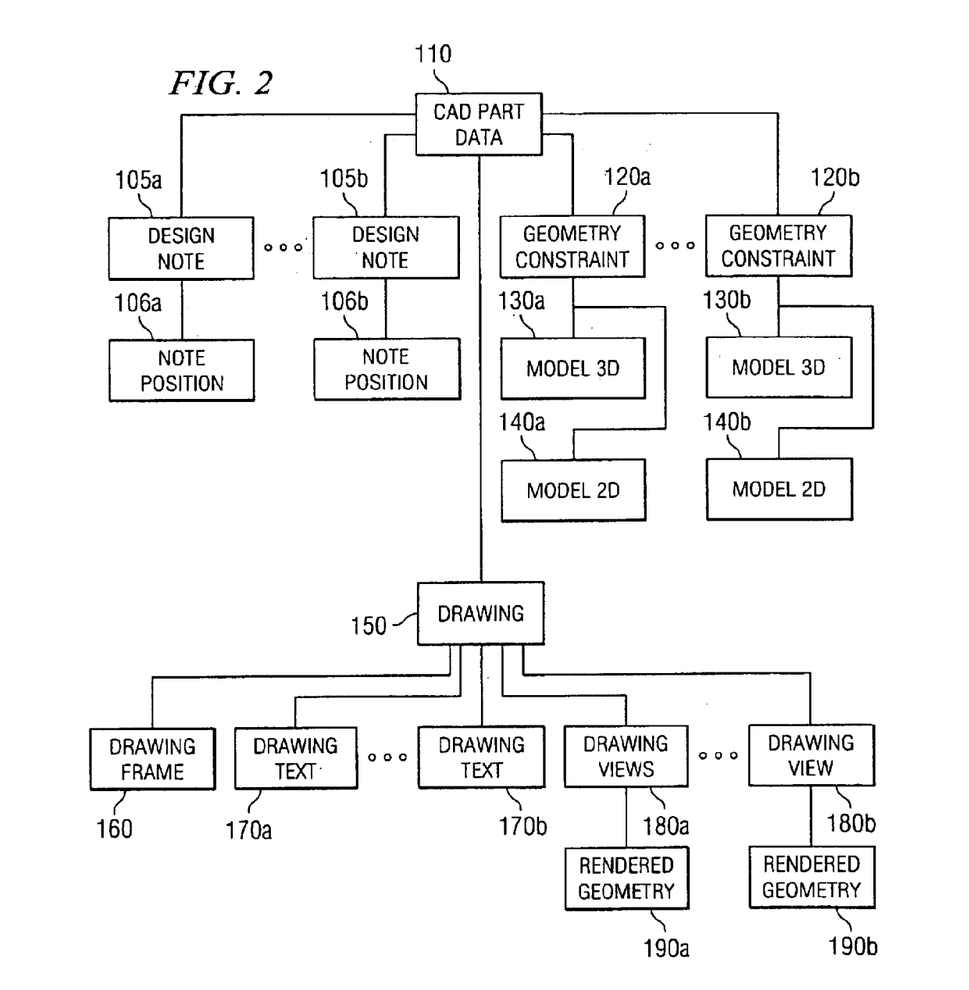
FIG. 2 is a block diagram of a CAD Model object model implemented in accordance with the invention.

FIG. 2 is a block diagram illustrating a preferred embodiment 100 of the CAD Model object model 10a of FIG. 1, which provides the model for storing 3D mechanical CAD data in a tool neutral persistent form. In this embodiment, not only is the CAD specific geometry data stored, but also the non-geometry data (e.g., design notes) that was created within the CAD tool.

As illustrated in FIG. 2, the major articles of information in the CAD Model object model 100 include: CAD Part Data 110, Geometry Constraints 120, 3D Model data 130, 2D Model data 140, Drawing 150, Drawing Frame 160, Drawing Text 170, Drawing View 180, Rendered Geometry 190, Design Note 105, and Note Position 106.

The CAD Part Data 110 encapsulates information about a mechanical part such as its description, common name, properties, and location (i.e., transformation), along with data object information such as creator, update time, person and status.

The Geometry Constraint 120 represents a constraint on the geometry that exists between several separate parts. It defines a relationship between the constrained parts. 3D Model 130 encapsulates the actual 3-dimenisonal geometry and topology of the part. 2D Model 140 encapsulates the actual 2-dimenisonal geometry and topology of the part.

Drawing 150 encapsulates a rendering of the geometry into some display form. This could be a traditional engineering drawing or a VRML or other format file. Drawing Frame 160 encapsulates a frame or background in which Drawing Text objects 170, Drawing View objects 180, and Rendered Geometry objects 190 are placed. Drawing Text 170 encapsulates formatted text that is placed in the Drawing. DrawingView 180 encapsulates a view of the geometry rendered in a particular way, for example an isometric view. RenderedGeometry 190 encapsulates the formatted data for the Drawing View 180.

Design Note 105a, 105b encapsulates a note associated with the CAD Part Data object 110, which may be constrained to a particular position on the display screen as encapsulated by an associated Note Position object 106.

Within the CAD Model object model 100, there exist relationships between the data objects, as illustrated by connecting lines between the objects. For example, each CAD Part Data object 110 may have associated with it a Drawing object 150, which will have associated with it a single Drawing Frame object 160, zero or more Drawing Text objects 170a, 170b, and zero or more Drawing Views 180a, 180b. Each Drawing View 180a, 180b has associated with it a respective Rendered Geometry object 190a and 190b. The CAD Part Data object 110 may have zero or more Geometry Constraint objects 120a, 120b associated with it. Each Geometry Constraint object 120a, 120b will typically have a 3D Model object 130a, 130b and/or a 2D Model object 140a, 140b associated with it. In addition, any number of Design Notes 105a, 105b may be associated with the CAD Part Data object 110, which may each respectively have an associated Note Position object 106a, 106b.

Because of the tool neutral persistent form and separation of geometry data from non-geometry data in accordance with the invention, the non-geometry data of the CAD Model object model is available for modification by non-CAD tools that understand the CAD Model public interface.

Figure 3:
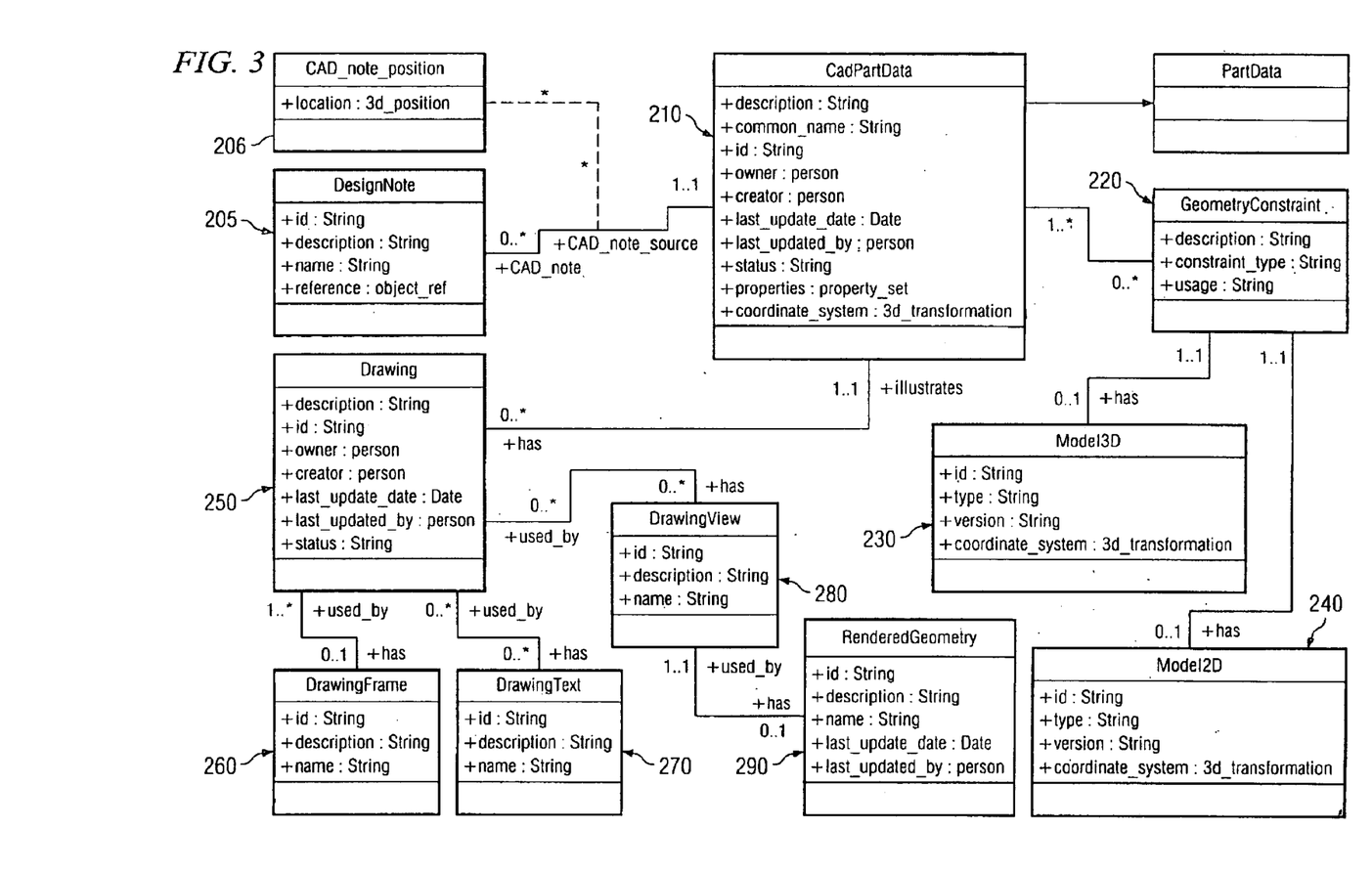
FIG. 3 is a UML interface diagram illustrating a preferred embodiment of the CAD Model object model interface for the CAD Model object model shown in FIG. 2.

FIG. 3 is a UML interface diagram illustrating a preferred embodiment of the CAD Model object model interface for the CAD Model object model 100 of FIG. 2. As illustrated in FIG. 3, the public interfaces defined for the CAD Model object model 200 of FIG. 2 include: CADPartData 210, GeometryConstraint 220, Model 3D 230, Model 2D 240, Drawing 250, DrawingFrame 260, DrawingText 270, DrawingView 280, RenderedGeometry 290, DesignNote 205, and NotePosition 206. The attributes for each interface are as displayed in FIG. 3. In the CAD Model interface definition, information about each part is encapsulated in a CAD Part Data object 110 (FIG. 2) accessed using the CADPartData 210 interface. In this embodiment, CADPartData 210 is an extension of PartData from the Product Structure module. As illustrated, the CADPartData interface 210 has zero or more Drawing interfaces 250, which provide access to zero or more Drawing objects 150 associated with the particular part. Each Drawing interface 250 is associated with zero or one DrawingFrame interface 260 (which may be used to access the Drawing Frame object 160 associated with the Drawing object 150), zero or more DrawingText interfaces 270 (which may be used to access to the Drawing Text objects 170a, 170b associated with the Drawing object 150), and zero or more DrawingView interfaces 280 (which may be used to access to the Drawing View objects 180a, 180b associated with the Drawing object 150). Each DrawingView interfaces 280 has zero or one RenderedGeometry interfaces 290 for accessing the Rendered Geometry object 190a, 190b associated with its associated Drawing View object 180a, 180b.

As also illustrated, the CADPartData interface 210 is associated with zero or more GeometryConstraint interfaces 220, which provide access to zero or more Geometry Constraint objects 120 associated with the particular part. Each GeometryConstraint interface 220 has zero or one Model 3D interface 230 and zero or on Model 2D interface 240, which respectively provide access to an associated 3D Model object 130 and/or an associated 2D Model object 140.

CADPartData interface 210 is also associated with zero or more DesignNote interfaces 205, which provide access to zero or more Design Note objects 105a, 105b associated with the particular part. Each DesignNote interface 205 has zero or one NotePosition interface 206, which provides access to the respective Note Position objects 106a, 106b associated with the Design Note objects 105a, 105b.

The interfaces defined in the UML diagram of FIG. 2 are preferably implemented in an object-oriented language such as C++ or Java2. The actual class implementation may vary from system to system, since it will often make sense to combine some of the interfaces into a single class for efficiency of implementation and/or performance.

Figure 4:
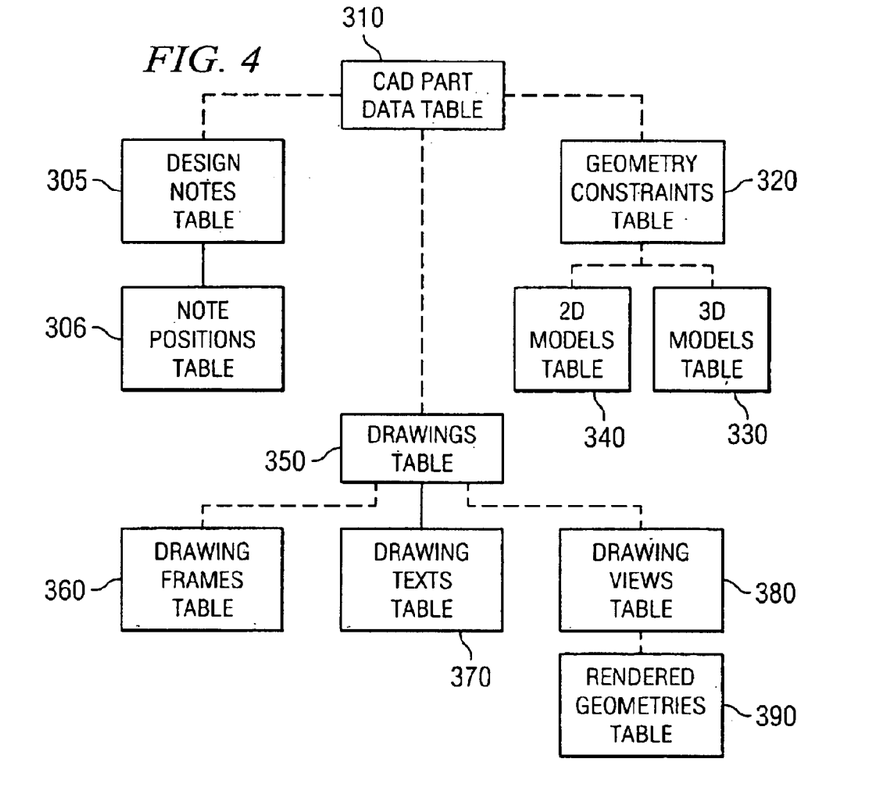
FIG. 4 is a block diagram of the persistent storage entities generated and maintained by the CAD Model object model of FIG. 2 using the interfaces defined in FIG. 3.

FIG. 4 is a block diagram illustrating one embodiment of the persistent storage entities generated and maintained by the CAD Model object model 100 of FIG. 2 using the interfaces defined in FIG. 3. In this embodiment, each of the interfaces has associated with it a persistent storage file, preferably in the form of a relational database. The data encapsulated using each respective interface is stored in its respective relational database file. Accordingly, there is a separate relational database file for each defined interface. In the illustrative embodiment, a CAD Part Data table 310 stores all data accessed using the CADPartData interface 210, Geometry Constraint table 320 stores all data accessed using the GeometryConstraint 220, 3D Models table 330 stores all data accessed using the Model 3D interface 230, 2D Models table 340 stores all data accessed using the Model 2D interface 240, Drawings table 350 stores all data accessed using the Drawing interface 250, Drawing Frame table 360 stores all data accessed using the DrawingFrame interface 260, Drawing Text table 370 stores all data accessed using the DrawingText interface 270, Drawing View table 380 stores all data accessed using the DrawingView interface 280, Rendered Geometry table 390 stores all data accessed using the RenderedGeometry interface 290, Design Note table 305 stores all data accessed using the DesignNote interface 205, and Note Position table 306 stores all data accessed using the NotePosition interface 206. The dashed lines connecting the various tables represents a foreign key (i.e., a common column in each connected relational database) used to represent relationships between data stored in the tables.

Figure 5:
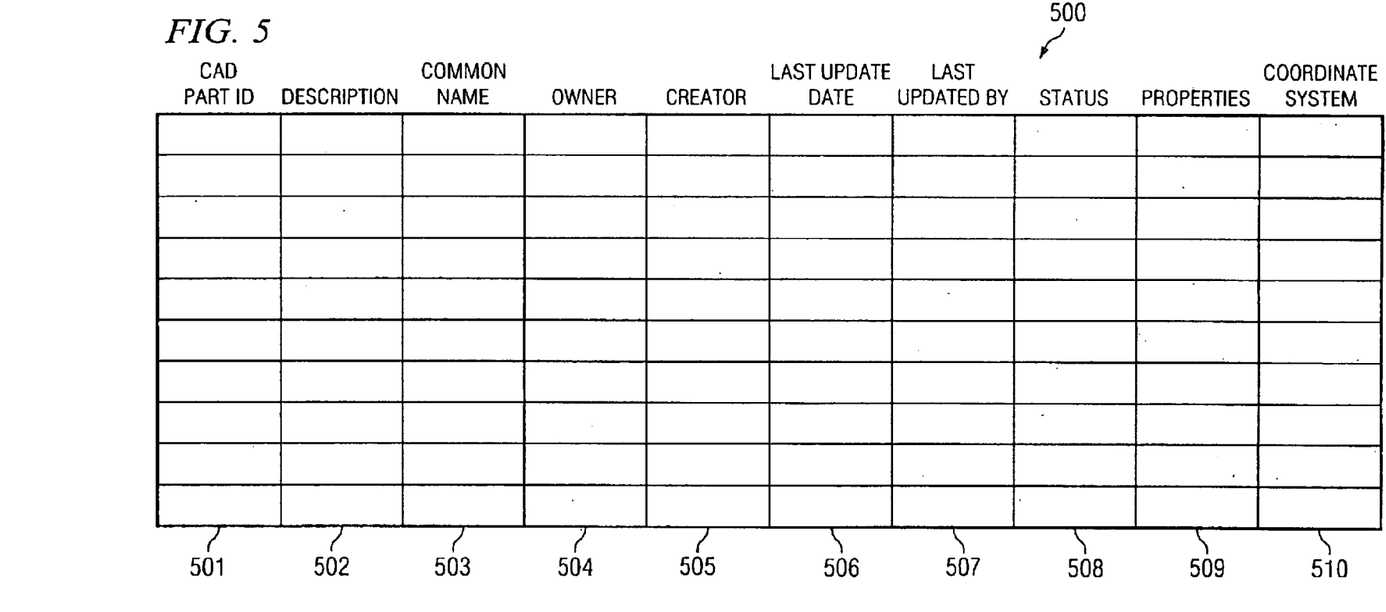
FIG. 5 is an illustrative example of a relational database file implementing a CAD Part Data table in accordance with the invention.

FIG. 5 is an illustrative example of a relational database file 410 implementing a CAD Part Data table 310. As illustrated, each column 501, 502, 503, 504, 505, 506, 507, 508, 509, and 510 maps to an attribute encapsulated by the CADPartData interface 210 and each row maps to a different CAD Part Data object 110. In this example, the primary key (i.e., a unique identifier across the file) for each part is its Part ID (in this embodiment stored in column 501).

Figure 6:
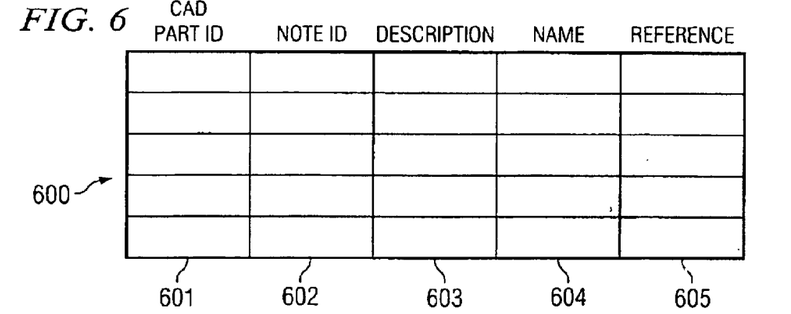
FIG. 6 is an illustrative example of a relational database file implementing a Design Notes table in accordance with the invention.

FIG. 6 is an illustrative example of a relational database file 405 implementing a Design Notes table 305. As illustrated, each column 602, 603, 604, and 605 maps to an attribute encapsulated by the DesignNotes interface 205 and each row maps to a different Design Note object 105. In this example, the primary key (i.e., a unique identifier across the file) for each design note object is its Note ID (in this embodiment stored in column 602). The Part ID of the CAD Part Data object to which the Design Note object 105 is associated is used as the foreign key; accordingly a foreign key column 601 is provided to map a Design Note object to its associated CAD Part Data.

Figure 7:
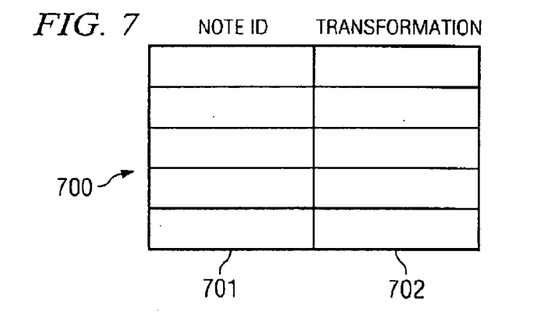
FIG. 7 is an illustrative example of a relational database file implementing a Notes Position table in accordance with the invention.

FIG. 7 is an illustrative example of a relational database file 406 implementing a Notes Position table 306. As illustrated, 702 maps to the transformation attribute encapsulated by the NotesPosition interface 206 and each row maps to a different Note Position object 106. In this example, the primary key (i.e., a unique identifier across-the file) for each design note object is its Note ID (in this embodiment stored in column 602). The Note ID of the Design Note object 105 to which the Note Position object 106 is associated is used as the foreign key; accordingly a foreign key column 701 is provided to map a Note Position object 106 to its associated Design Note object 105.

Figure 8:
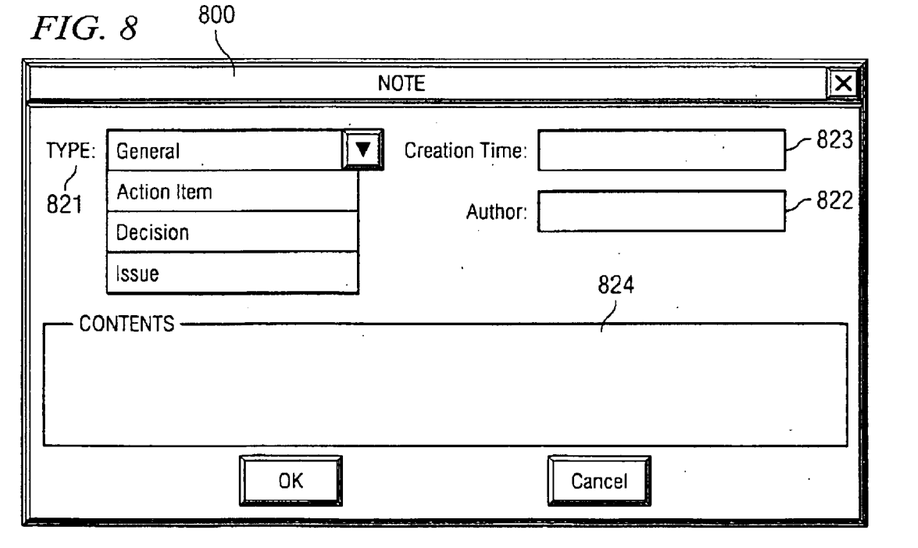
FIG. 8 is a create note dialog in a graphical user interface implemented in accordance with the invention.

The methods by which certain CAD Model data is captured varies according to the type of data captured. Data may be captured when a user manually enters the data via a user interface dialog (for example, when a user enters a Design Note using a Design Note dialog in the application's user interface), or may be created automatically by an application (for example, attributes such as Creation Time or Last Modified Date may be automatically captured by the application at the time an article of information is captured or modified). FIG. 8 is an example Design Note dialog 800 of a graphical user interface for a CAD application that is displayed when the user enters a Design Note. As illustrated, the Design Note dialog 800 includes user capabilities to set certain attributes of a Design Note object. In particular, the Design Note dialog 800 allows the user to select the type of note to be created. In the illustrative embodiment, the type of note is selectable via a drop-down menu 821, which allows the user to set the note type to one of either a General Note 821a, an Action Item 821b, a Decision 821c, or an Issue 821d. Each note type has a set of note type specific attributes which are displayed in the Design Note dialog 800 upon selection of the note type by the user. The note type specific attributes include a different set of attributes for each note type. For example, the General Note 821*a* type may display only the standard editable Author attribute 822 and Creation Time attribute 823. These attributes may be filled in by the author of the note, or alternatively may be filled in automatically (with overwrite capability) by the application using user configuration information. If instead the Action Item type 821*b* is selected, for example, additional editable attributes may be displayed (such as an Assigned To attribute, a Due Date attribute, and a Status attribute, not shown). Preferably, the Design Note dialog 800 allow the user to create add note type categories. In each note type, a content field 824 is displayed. The content field 824, which contains the substantive information of the Design Note, is filled in by the user.

As described in detail above, the invention provides a novel way of storing and accessing CAD Model data, including geometry and non-geometry data, in a tool neutral persistent form with a known public interface. It will be appreciated from a reading of the above detailed description that the invention affords several advantages over the prior art. First, this allows any tool to access and modify data (with appropriate permissions) without having to enter the tool environment that the data was created in. For example, the invention allows engineering managers to extract design notes associated with CAD model views of parts to generate a report of engineering activity without having to open or view the CAD models themselves. This increases the efficiency of understanding of the current design, and also reduces the number of CAD tool licenses required when using the CAD tool to capture the design notes. The clear segmentation of information across various tools allows for manipulation by multiple application tools and products. This overcomes the limitations of the prior art allowing limited access to information due to the unified tool environment.

In addition, the invention provides a source of integrated information that supports sophisticated querying to obtain interesting statistics and information. For example, during the development of a product, an unexpected result may begin occurring during the testing of the product. The CAD model object model database may be queried to obtain all part changes and all design notes associated with the parts changes within a range of dates to more quickly learn the cause of the unexpected result. The invention captures the evolutionary buildup of information necessary to the building of a project over time to collect the information pieces and relationships necessary to model within a computing environment the information and data needed to produce the product. In particular, the captured information primarily tracks and records the functional "as-designed" aspect of the product rather than the "as-built" configurations of the end product as done, if at all, in the prior art. The "as-designed" tracking thus provides a time spectrum from exploring product ideas to the complete and released-for-production product definition. The information gradually develops and evolves, becoming more detailed as the design process executes.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. An object model for capturing computer-aided design (CAD) related data, comprising:

a CAD part interface for capturing information pertaining to a CAD part in a part object being an instance of a part object class having a first relationship to one or more CAD drawing objects that illustrate said part object and are instances of a CAD drawing object class, said first relationship being defined by a CAD drawing object foreign key; and a drawing interface for capturing a CAD drawing in one of said CAD drawing objects;

wherein each of said part object and said drawing object is stored in a tool-neutral persistent form that is comprised of a relational database defined at least in part by said part object class comprising at least one of said part object, said CAD drawing object class comprising one or more of said CAD drawing objects, and said CAD drawing object foreign key linking said part object class to said CAD drawing object;

a design notes interface for capturing design notes related to said part in a design notes being an instance of a design notes class having a third relationship to one of said part objects, said third relationship being defined by a design notes foreign key;

wherein each of said design note object is stored in said tool-neutral persistent form wherein said relational database further comprises said design notes object class comprising at least one of said design notes object and said design notes foreign key, and wherein said design notes interface is operable to function without said CAD part interface.

2. An object model in accordance with claim 1, comprising:

a geometry constraints interface for capturing geometry constraints related to said part in a geometry constraints object being an instance of a geometry constraints object class having a fourth relationship to one of said part objects, said fourth relationship being defined by a geometry constraints foreign key;

wherein each of said geometry constraints object is stored in said tool-neutral persistent form wherein said relational database further comprises said geometry constraints object class comprising at least one of said geometry constraints object and said geometry constraints foreign key.

3. An object model in accordance with claim 1, wherein said drawing comprises a frame, said object model comprising:

a drawing frame interface for capturing a frame associated with said drawing in a drawing frame object being an instance of a drawing frame class having a fifth relationship to one of said drawing objects, said fifth relationship being defined by a drawing frame foreign key;

wherein each of said drawing frame object is stored in said tool-neutral persistent form wherein said relational database further comprises said drawing frame class comprising at least one of said drawing frame object and said drawing frame foreign key.

4. An object model in accordance with claim 3, wherein said drawing comprises associated text, said object model comprising:

a drawing text interface for capturing said associated text in a drawing text object being an instance of a drawing text class having a sixth relationship to one of said drawing objects, said sixth relationship being defined by a drawing text foreign key;

wherein each of said drawing text object is stored in said tool-neutral persistent form wherein said relational database further comprises said drawing text class comprising at least one of said drawing text object and said drawing text foreign key.

5. An object model in accordance with claim 4, wherein said drawing comprises a view, said object model comprising:

a view frame interface for capturing a view associated with said drawing in a drawing view object being an instance of a drawing view class having a seventh relationship to one of said drawing objects, said seventh relationship being defined by a view frame foreign key;

wherein each of said drawing view object is stored in said tool-neutral persistent form wherein said relational database further comprises said drawing view class comprising at least one of said drawing view object and said view frame foreign key.

6. A method for capturing computer-aided design (CAD) related data, comprising:

capturing information pertaining to a CAD part in a part object being an instance of a part object class having a first relationship to one or more CAD drawing objects that illustrate said part object and are instances of a CAD drawing object class, said first relationship being defined by a CAD drawing object foreign key;

capturing a CAD drawing in said CAD drawing object; and storing each of said part object and said drawing object in a tool-neutral persistent form that is comprised of a relational database defined at least in part by said part object class comprising at least one of said part object, said CAD drawing object class comprising one or more of said CAD drawing objects, and said CAD drawing object foreign key linking said part object class to said CAD drawing object capturing design notes related to said part in a design notes object being an instance of a design notes class having a third relationship to one of said part objects, said third relationship being defined by a design notes foreign key;

storing each of said design note object in said tool-neutral persistent form wherein said relational database further comprises said design notes object class comprising at least one of said design notes object and said design notes foreign key, and wherein said design notes interface is operable to function without said CAD part interface.

7. A method in accordance with claim 6, comprising:

capturing geometry constraints related to said part in a geometry constraints object being an instance of a geometry constraints object class having a fourth relationship to one of said part objects, said fourth relationship being defined by a geometry constraints foreign key; and storing each of said geometry constraints object in said tool-neutral persistent form wherein said relational database further comprises said geometry constraints object class comprising at least one of said geometry constraints object and said geometry constraints foreign key.

8. A method in accordance with claim 6, wherein said drawing is associated with a drawing frame, said method comprising:

capturing a frame associated with said drawing in a drawing frame object being an instance of a drawing frame class having a fifth relationship to one of said drawing objects, said fifth relationship being defined by a drawing frame foreign key;

storing each of said drawing frame object in said tool-neutral persistent form wherein said relational database further comprises said drawing frame class comprising at least one of said drawing frame object and said drawing frame foreign key.

9. A method in accordance with claim 8, wherein said drawing has associated drawing text, said method comprising:

capturing said associated text in a drawing text object being an instance of a drawing text class having a sixth relationship to one of said drawing objects, said sixth relationship being defined by a drawing text foreign key; and storing each of said drawing text object in said tool-neutral persistent form wherein said relational database further comprises said drawing text class comprising at least one of said drawing text object and said drawing text foreign key.

10. A method in accordance with claim 9, wherein said drawing has an associated drawing view, said method comprising:

capturing a drawing view associated with said drawing in a drawing view object being an instance of a drawing view class having a seventh relationship to one of said drawing objects, said seventh relationship being defined by a view frame foreign key; and storing each of said drawing view object in said tool-neutral persistent form wherein said relational database further comprises said drawing view class comprising at least one of said drawing view object and said view frame foreign key.

11. A computer readable storage medium tangibly embodying program instructions implementing a method for capturing computer-aided design (CAD) related data, the method comprising the steps of:

capturing information pertaining to a CAD part in a part object being an instance of a part object class having a first relationship to one or more CAD drawing objects that illustrate said part object and are instances of a CAD drawing object class, said first relationship being defined by a CAD drawing object foreign key;

capturing a CAD drawing in said CAD drawing object; and storing each of said part object and said drawing object in a tool-neutral persistent form that is comprised of a relational database defined at least in part by said part object class comprising at least one of said part object, said CAD drawing object class comprising one or more of said CAD drawing objects, and said CAD drawing object foreign key linking said part object class to said CAD drawing object capturing design notes related to said part in a design notes object being an instance of a design notes class having a third relationship to one of said part objects, said third relationship being defined by a design notes foreign key;

storing each of said design note object in said tool-neutral persistent form wherein said relational database further comprises said design notes object class comprising at least one of said design notes object and said design notes foreign key, and wherein said design notes interface is operable to function without said CAD part interface.

12. The computer readable storage medium of claim 11, the method comprising:

capturing geometry constraints related to said part in a geometry constraints object being an instance of a geometry constraints object class having a fourth relationship to one of said part objects, said fourth relationship being defined by a geometry constraints foreign key; and storing each of said geometry constraints object in said tool-neutral persistent form wherein said relational database further comprises said geometry constraints object class comprising at least one of said geometry constraints object and said geometry constraints foreign key.

13. The computer readable storage medium of claim 11, the method comprising:

capturing a frame associated with said drawing in a drawing frame object being an instance of a drawing frame class having a fifth relationship to one of said drawing objects, said fifth relationship being defined by a drawing frame foreign key;

storing each of said drawing frame object in said tool-neutral persistent form wherein said relational database further comprises said drawing frame class comprising at least one of said drawing frame object and said drawing frame foreign key.

14. The computer readable storage medium of claim 11, the method comprising:

capturing said associated text in a drawing text object being an instance of a drawing text class having a sixth relationship to one of said drawing objects, said sixth relationship being defined by a drawing text foreign key; and storing each of said drawing text object in said tool-neutral persistent form wherein said relational database further comprises said drawing text class comprising at least one of said drawing text object and said drawing text foreign key.

15. The computer readable storage medium of claim 11, the method comprising:

capturing a drawing view associated with said drawing in a drawing view-object being an instance of a drawing view class having a seventh relationship to one of said drawing objects, said seventh relationship being defined by a view frame foreign key; and storing each of said drawing view object in said tool-neutral persistent form wherein said relational database further comprises said drawing view class comprising at least one of said drawing view object and said view frame foreign key.

* * * * *